US010421679B2

(12) United States Patent
Razavi-Shirazi et al.

(10) Patent No.: US 10,421,679 B2
(45) Date of Patent: *Sep. 24, 2019

(54) HIGH BIOACTIVITY DENSITY, AEROBIC WASTEWATER TREATMENT

(71) Applicant: MICROVI BIOTECH INC., Hayward, CA (US)

(72) Inventors: Fatemeh Razavi-Shirazi, Hayward, CA (US); Ameen Razavi, Fremont, CA (US)

(73) Assignee: MICROVI BIOTECH, INC., Hayward, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/519,070

(22) PCT Filed: Oct. 14, 2015

(86) PCT No.: PCT/US2015/055561
§ 371 (c)(1),
(2) Date: Apr. 13, 2017

(87) PCT Pub. No.: WO2016/061248
PCT Pub. Date: Apr. 21, 2016

(65) Prior Publication Data
US 2017/0217806 A1    Aug. 3, 2017

Related U.S. Application Data

(60) Provisional application No. 62/122,191, filed on Oct. 14, 2014.

(51) Int. Cl.
*C02F 3/10* (2006.01)
*C02F 3/34* (2006.01)
(Continued)

(52) U.S. Cl.
CPC .............. *C02F 3/108* (2013.01); *C02F 3/302* (2013.01); *C02F 3/342* (2013.01);
(Continued)

(58) Field of Classification Search
CPC .................................. C02F 3/108; C02F 3/342
(Continued)

(56) References Cited

U.S. PATENT DOCUMENTS 5,770,079 A * 6/1998 Haase ................. C02F 1/685
                                                           210/150
5,980,738 A * 11/1999 Heitkamp ................ C02F 3/06
                                                           210/150
(Continued)

FOREIGN PATENT DOCUMENTS

WO    1995/017351 A1    6/1995

OTHER PUBLICATIONS

Lui et al, CN 102557274, Abstract. (Year: 2012).*
(Continued)

*Primary Examiner* — Claire A Norris
(74) *Attorney, Agent, or Firm* — Dentons US LLP

(57) ABSTRACT

Aerobic processes are disclosed for the treatment of wastewater which contains at least one substrate comprising at least one of organocarbon component and ammonium cation. A bioreactor is used for the treatment which contains ME biocatalysts to provide high bioreactor bioactivity density. The processes reduce sludge generated and are capable of effecting the metabolic oxidation at low dissolved oxygen concentrations.

20 Claims, 1 Drawing Sheet

(51) Int. Cl.
*C02F 3/30* (2006.01)
*C02F 101/16* (2006.01)
*C02F 101/30* (2006.01)

(52) U.S. Cl.
CPC ...... *C02F 2101/16* (2013.01); *C02F 2101/30* (2013.01); *Y02W 10/15* (2015.05)

(58) Field of Classification Search
USPC ........................................................ 210/616
See application file for complete search history.

(56) References Cited

U.S. PATENT DOCUMENTS

| | | | |
|---|---|---|---|
| 6,214,619 B1 * | 4/2001 | Sato | C02F 3/108 210/601 |
| 2004/0182781 A1 * | 9/2004 | Davis | C02F 3/10 210/615 |
| 2008/0110828 A1 * | 5/2008 | Yerushalmi | C02F 3/06 210/620 |
| 2013/0337518 A1 | 12/2013 | Razavi-Shirazi et al. | |

OTHER PUBLICATIONS

International Search Report dated Feb. 2, 2016 corresponding to International Patent Application No. PCT/US2015/055561, 2 pages.
Written Opinion of the International Searching Authority dated Feb. 2, 2016 corresponding to International Patent Application No. PCT/US2015/055561, 5 pages.

* cited by examiner

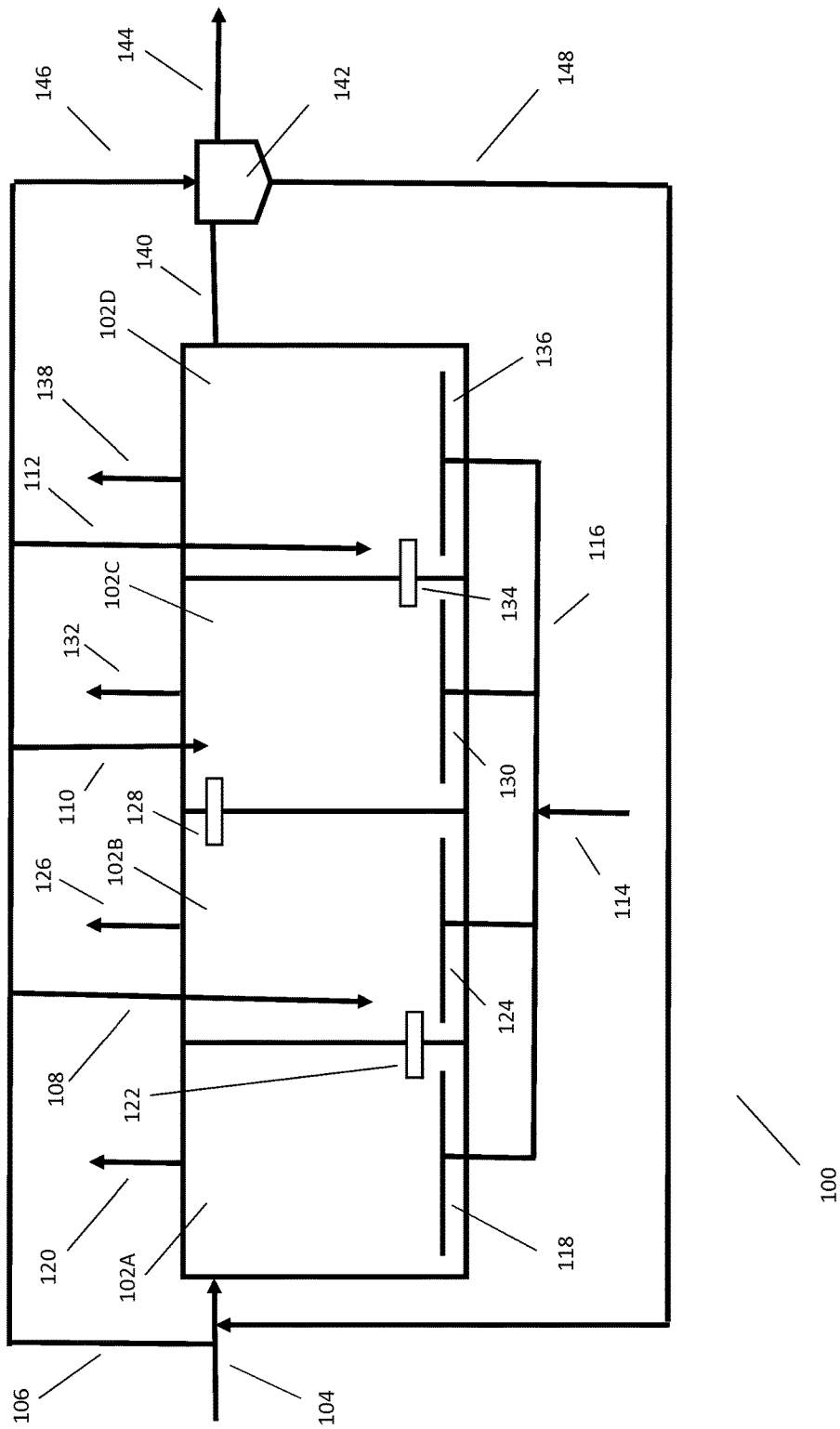

HIGH BIOACTIVITY DENSITY, AEROBIC WASTEWATER TREATMENT

CROSS-REFERENCE TO PRIOR APPLICATIONS

This application is a National Stage of PCT/US2015/055561, filed Oct. 14, 2015, and designating the United States (published on Apr. 21, 2016, as WO 2016/061248 A1), which claims priority under 35 U.S.C. § 119 to United States Provisional Patent Application No.: 62/122,191, filed on Oct. 14, 2014, each hereby expressly incorporated by reference in its entirety and each assigned to the assignee hereof.

FIELD OF THE INVENTION

This invention pertains to aerobic wastewater treatment processes, particularly to such processes having high bioreactor bioactivity density, especially for the bioconversion of organocarbon components to oxidized products, especially carbon dioxide, and the nitrification of ammonium cation.

BACKGROUND

Aerobic wastewater treatment, especially for industrial, municipal and agricultural wastewaters, bioconverts organocarbons and ammonium cation (the term ammonium cation as used herein encompasses both ammonium cation and dissolved ammonia in the wastewater). The component or components being bioconverted in an aerobic wastewater treatment process are referred to herein as substrate. The oxygen for the bioconversion is supplied by air, oxygen enriched air or pure oxygen. In some facilities, the oxygen-containing gas is bubbled through a bioreactor containing the wastewater. Mass transfer of oxygen to the wastewater occurs from the bubbles, and the bubbles also agitate the wastewater in the bioreactor. The treated water is conventionally subjected to a solids separation unit operation, e.g., a clarifier, to provide a clear water stream and a sludge. The types of processes are characterized as attached growth (static fixed film or dynamic fixed film) or suspended growth using activated sludge.

The aerobic digestion is usually effected by indigenous microorganisms in recycled sludge (activated sludge). These microorganisms may be in the water to be treated and are sometimes supplied externally, and are usually wild-type (naturally-occurring) microorganisms. The relative amount of sludge recycled is subject to practical limitations. For instance, since in suspended growth the microorganisms are typically dispersed in the wastewater as substantially free cells and agglomerates of cells, cell density must be maintained at concentrations below those which result in the wastewater having unduly high viscosities. High viscosities not only adversely affect agitation and transfer of oxygen to the wastewater but also adversely affect the solids separation unit operation. Moreover, at higher cell densities, the cells tend to form more agglomerates which limit the mass transfer of oxygen and substrate to the cells located within the agglomerates. Hence, there is a practical limitation as to the rate of aerobic digestion per unit volume of bioreactor (bioreactor bioactivity).

Moving bed biofilm reactors are one type of attached growth bioreactors for wastewater treatment. These systems use polyethylene, or other polymeric, carrier elements upon which bacteria are attached on the surfaces thereby enabling a higher cell density than can be achieved in a freely suspended cell system. The benefit from the higher concentration of microorganisms is the ability to have higher throughput for a given bioreactor volume, i.e., a higher bioactivity density. Also, in some instances, the recycling of sludge is not required although sludge is generated and requires handling and disposal. These bioreactors are able to achieve bioreactor bioactivities greater than those of activated sludge systems. However, the mass of the biofilms is limited by the available surface area of the carrier, and the densities of the biofilms limit the ability for passage of fluid to internally located microorganisms. Consequently, moving bed biofilm reactors also have restrictions to achieving high bioreactor bioactivity densities.

These aerobic wastewater treatment processes generate sludge. The sludge comprises live and dead microorganisms and their debris and other solids which may have been contained in the wastewater or may be the product of a bioconversion. Frequently about 20 to 50 percent of the carbon and oxygen consumed during the bioconversion is for growth of the population of the microorganisms, and in a steady-state process, a mass substantially equivalent to the amount of this growth will be contained in the sludge. Hence, the volumes of sludge generated can be significant. The sludge separation unit operation is often a bottleneck, especially where the sludge separation is effected by a gravity separation. The sludge has to be disposed in a suitable manner, which can be more problematic if the sludge contains toxic or other environmentally undesired components.

In some wastewater treatment facilities, such as municipal wastewater treatment facilities, the influx of wastewater can vary substantially depending upon the time of day and external factors such as the occurrence of rain or snow melt. Although facilities are typically designed for peak wastewater flows, periods can exist where flows exceed the capacity of the facility. Moreover, an increasing population of users for a given wastewater treatment facility can lead to exceeding the design capacity of the facility, especially during periods of peak wastewater flow to the facility. The facility is faced with a couple of alternatives if it does not expand its capacity. First, discharge of untreated wastewater, and second, retention basins can be used to hold the wastewater until the facility can process the excess wastewater.

Shirazi, et al., in United States published patent application 20130337518 disclose biocatalysts having:

i. a solid structure of hydrated hydrophilic polymer defining an interior structure having a plurality of interconnected major cavities having a smallest dimension of between about 5 and 100 microns and an HEV of at least about 1000 and ii. a population of microorganisms substantially irreversibly retained in the interior of the solid structure, said population of microorganisms being in a concentration of at least about 60 grams per liter based upon the volume defined by the exterior of the solid structure when fully hydrated, wherein the microorganisms maintain their population substantially stable. The irreversibly retained microorganisms are believed to undergo phenotypic alterations. Moreover, the biocatalyst has a long lifetime and competition with undesired microorganism is substantially eliminated. For ease of reference, these biocatalysts are herein referred to as ME biocatalysts. The ME biocatalysts have been proposed for many processes including, but not limited to, wastewater treatment such as aerobic digestion, anaerobic digestion, phosphorus removal, metal removals, nitrification, and denitrification.

SUMMARY

In accordance with this invention, aerobic wastewater treatment processes are provided that reduce generated sludge and have a high bioreactor bioactivity density. Generated sludge is the difference in mass between the solids in the wastewater to be treated and those in the treated wastewater. The processes of this invention, while being operable in a batch or semi-batch mode, are particularly advantageous for continuous operations to treat wastewater. The aerobic bioconversions of this invention can be used to bioconvert one or both of organocarbon components and ammonium cation. For the sake of convenience, the metabolic conversion is sometimes referred to herein as an oxidation or as oxidizing substrate as the bioconversion results in moieties having oxygen atoms such as carbon dioxide and nitrate and/or nitrite anion. As used herein, organocarbon components are those containing carbon-hydrogen bonds and may contain heteroatoms including, but not limited to sulfur, nitrogen, phosphorus, oxygen, halogens and metals.

The processes of this invention use ME biocatalysts to achieve a high bioconversion activity per unit volume of the bioreactor (bioreactor bioconversion density) such that adventitious microorganisms in the wastewater are not able to generate populations that result in the substantial sludge formation that occur in conventional wastewater treatment operations. Moreover, this high bioreactor bioactivity density can be maintained without undue adverse effect on the viscosity of the wastewater being treated. The microorganisms used in the biocatalysts can be targeted to the sought activity and can retain that activity. Although adventitious microorganisms may be present and even contribute to the sought bioconversion, the ME biocatalysts can retain the targeted microorganism population due to (a) the ME biocatalyst hindering or excluding the entry of adventitious microorganisms into to interior of the ME biocatalyst, (b) the ME biocatalyst itself inhibiting the adhesion of adventitious microorganisms to its surfaces which adhesion could result in the formation of biofilms of the adventitious microorganisms and (c) the targeted microorganisms irreversibly retained in the ME biocatalyst being well established and thus have a competitive advantage with respect to that of adventitious microorganisms entering the interior of the ME biocatalyst.

The high bioreactor bioactivity density results in low hydraulic retention times in a bioreactor to achieve a given degree of bioconversion of substrate. Often, as compared to an activated sludge wastewater treatment process, the hydraulic retention time for a given bioconversion of substrate can be reduced by at least 25, and most frequently by at least 40, percent. While not wishing to be limited to theory, it is believed that (i) the high microorganism density provided by the ME biocatalyst used in the processes of this invention; (ii) the accessibility to the microorganisms that are irreversibly retained in the ME biocatalyst; and (iii) the ability to maintain the wastewater at a low viscosity which facilitates movement of the wastewater and mass transfer of oxygen to the biocatalysts, contribute to achieving the high bioactivities. The high bioreactor bioactivities densities and good mass transfer enable, if desired, the ability to effect the aerobic bioconversion even at low oxygen concentrations in the wastewater being treated, e.g., below about 3, and sometimes between about 1 and 3, say, 1.5 and 2.5, milligrams of oxygen per liter of wastewater. These low levels of oxygen serve to reduce the costs of aeration of the wastewater and, in some instances, enable denitrification to occur in the same bioreactor, especially where denitrifying microorganisms are contained in an ME biocatalyst.

In one broad aspect, this invention pertains to processes for treating wastewater containing at least one substrate comprising at least one of organocarbon component and ammonium cation and at least one population of adventitious microorganisms capable of bioconverting said substrate and generating sludge, said processes comprising contacting said wastewater in a bioreactor under aerobic metabolic conditions with biocatalyst for a time sufficient to oxidize at least a portion of the substrate and provide a treated wastewater, and selectively removing the treated wastewater from the biocatalyst, wherein:
   a. the biocatalyst comprises:
      i. a solid structure of hydrated hydrophilic polymer defining an interior structure having a plurality of interconnected major cavities having a smallest dimension of between about 5 and 100 microns and an HEV of at least about 1000 and
      ii. a population of microorganisms capable of oxidizing said substrate, said population of microorganisms being substantially irreversibly retained in the interior of the solid structure, said population of microorganisms being in a concentration of at least about 60 grams per liter based upon the volume defined by the exterior of the solid structure when fully hydrated, wherein the microorganisms maintain their population substantially stable;
   b. the biocatalyst is present in the bioreactor in an amount sufficient to bioconvert substrate and inhibit the population growth of adventitious microorganisms, and preferably the irreversibly retained microorganism population in excess of about 8000 or 12,000 milligrams of cells per liter.

The reduction in generated sludge is ascertained by comparison with the net production of sludge (total sludge in the treated water less any activated sludge added) using a wastewater treatment process using activated sludge as the source of microorganisms to achieve a similar reduction in substrate concentration in the wastewater. Often, the generated sludge is less than about 10, preferably less than about 5, mass percent of that generated using a conventional activated sludge process. While not wishing to be limited by theory, it is believed that the high bioreactor bioactivity provided by the use of the biocatalysts in accordance with the processes of this invention, rapidly depletes substrate such that the population of microorganisms contained in the wastewater is adversely affected, i.e., not able to significantly grow. Sometimes the total cell density in the separated, treated wastewater is less than about 500, say, less than about 250, milligrams per liter. In some preferred embodiments of the processes of this invention, the biocatalyst provides a cell density in the bioreactor of at least about 8000, preferably at least about 12,000, and most preferably at least about 20,000, milligrams per liter.

Since the population growth of adventitious microorganisms is curtailed, the viscosity of the wastewater does not become unduly elevated to levels that would adversely affect the operation of the aerobic bioconversion or would adversely affect the separation of sludge from the treated wastewater. The lower viscosities facilitate mixing and thus aeration of the wastewater. Often the viscosity of the treated wastewater having an essential absence of biocatalyst is less than about 0.5, and most frequently less than about 0.1, say, less than about 0.025, Pascal second at 25° C.

Selective removal of the treated wastewater means that the ME biocatalyst and the treated wastewater are separated.

The selective removal can be by any suitable unit operation including, but not limited to, separation by density and separation by size and combinations thereof. The selective removal may occur in the bioreactor or may be in a unit operation external to the bioreactor. Where externally separated, preferably at least a portion, and more preferably, substantially all, of the separated ME biocatalyst is recycled for further use.

In another broad aspect, this invention pertains to processes for treating wastewater containing at least one substrate comprising at least one of organocarbon component and ammonium cation, said processes comprising contacting said wastewater in a bioreactor under aerobic metabolic conditions with biocatalyst for a time sufficient to oxidize at least a portion of the substrate and provide a treated wastewater, and selectively removing the treated wastewater from the biocatalyst, wherein:
   a. the biocatalyst comprises:
      i. a solid structure of hydrated hydrophilic polymer defining an interior structure having a plurality of interconnected major cavities having a smallest dimension of between about 5 and 100 microns and an HEV of at least about 1000 and
      ii. a population of microorganisms capable of oxidizing said substrate, said population of microorganisms being substantially irreversibly retained in the interior of the solid structure, said population of microorganisms being in a concentration of at least about 60 grams per liter based upon the volume defined by the exterior of the solid structure when fully hydrated, wherein the microorganisms maintain their population substantially stable;
   b. the biocatalyst is present in the bioreactor in an amount sufficient to provide a microorganism population in excess of about 8000 or 12,000 milligrams of cells per liter; and
   c. the wastewater in the bioreactor has a dissolved oxygen concentration of less than about 3, preferably less than about 2.5, milligrams per liter.

The dissolved oxygen concentration, for a batch process, is determined at the conclusion of the run, and for a continuous process, is determined from the water effluent from the bioreactor. In some instances, the wastewater in the bioreactor is under sufficient internal mixing that the concentration of oxygen in the wastewater is substantially uniform throughout the bioreactor. In these instances, the dissolved oxygen concentration can be determined by testing the wastewater in the bioreactor. The determination of dissolved oxygen concentration is conveniently determined using an oxygen probe suitable for analysis of wastewater.

DETAILED DISCUSSION

All patents, published patent applications and articles referenced in this detailed description are hereby incorporated by reference in their entireties.

As used herein, the following terms have the meanings set forth below unless otherwise stated or clear from the context of their use.

The use of the terms "a" and "an" is intended to include one or more of the element described. Lists of exemplary elements are intended to include combinations of one or more of the element described. The term "may" as used herein means that the use of the element is optional and is not intended to provide any implication regarding operability.

Adhering to the solid structure of the biocatalyst means that the microorganisms are located in cavities in the interior of the biocatalyst and are substantially irreversibly retained therein although extraordinary conditions and treatments (i.e., not normal bioconversion conditions for bioconversion using the microorganisms) might be able in some instances to cause the microorganism to exit the biocatalyst. Adhering includes surface attachment to the polymer forming the walls of the catalyst as well as where the retained microorganisms are proximate to a polymeric surface, e.g., within about 10 or 20 microns, but not directly contacting the surface. Adhering thus includes physical and electrostatic adherence. In some instances, the polymer used to make the biocatalyst may become embedded in the extracellular polymeric substance around a cell or even in or on the cell wall of the microorganism.

Adventitious microorganisms are microorganisms that may be adventitious to the wastewater or may be introduced into the wastewater from exogenous sources such as microorganisms borne in air or on surfaces with which the wastewater comes in contact or otherwise intentionally or unintentionally introduced.

Biochemical oxygen demand (BOD) is the amount of oxygen required for metabolic conversion of organic carbon in water to carbon dioxide and is an indication of the organic compounds available for food. BOD is reported as milligrams per liter. BOD can be determined by Standard Method 5210B, revision Nov. 16, 1999, as published by the U.S. Environmental Protection Agency.

Bioconversion activity is the rate of consumption of substrate per hour per gram (wet) of microorganism. Where an increase or decrease in bioconversion activity is referenced herein, such increase or decrease is ascertained under similar bioconversion conditions including concentration of substrate and product in the aqueous medium. Bioconversion activity to bioproduct is the rate of production of the bioproduct per hour per gram of microorganism. Bioreactor bioactivity is the rate of consumption of substrate per hour based upon a unit volume of bioreactor and thus may not be the same as bioconversion activity.

Biofilm means an aggregate of microorganisms embedded within an extracellular polymeric substance (EPS) generally composed of polysaccharides, and may contain other components such as one or more of proteins, extracellular DNA and the polymer used to make the biocatalyst. The thickness of a biofilm is determined by the size of the aggregate contained within a continuous EPS structure, but a continuous EPS structure does not include fibrils that may extend between separated biofilms. In some instances, the biofilm extends in a random, three dimensional manner, and the thickness is determined as the maximum, straight line distance between the distal ends. A thin biofilm is a biofilm which does not exceed about 10 microns in any given direction.

Chemical oxygen demand (COD) is the amount of oxygen required to convert organic carbon in water to carbon dioxide and thus is an indication of the organic compound content of the water. COD is reported as milligrams per liter. One procedure for determining COD is Hach Method 8000, February 2009, Ninth Edition.

A state of essential stasis means that a microorganism population has undergone a substantial cessation of metabolic bioconversion activity but can be revived. The existence of an essential stasis condition can be ascertained by measuring bioconversion activity. The essential stasis condition may be aerobic, anoxic or anaerobic which may or may not be the same as that of normal operating conditions for the microorganism.

An exo-network is a community of spaced-apart microorganisms that can be in the form of individual cells or biofilms that are interconnected by extracellular polymeric substance in the form of strands. The spacing between the microorganisms or biofilms in the exo-network is sufficient to enable the passage of nutrients and substrates there between and is often at least about 0.25, say, at least about 0.5, micron and may be as large as 5 or 10 microns or more.

Exterior skin is an exterior layer of polymer on the biocatalyst that is less open than the major channels in the interior structure of the biocatalyst. A biocatalyst may or may not have a skin. Where a skin is present, it may or may not have surface pores. Where no surface pores are present, fluids diffuse through the skin. Where pores are present, they often have an average diameter of between about 1 and 10 microns.

Fully hydrated means that a biocatalyst is immersed in water at 25° C. until no further expansion of the superficial volume of the biocatalyst is perceived.

The "Hydration Expansion Volume" (HEV) for a biocatalyst is determined by hydrating the biocatalyst in water at 25° C. until the volume of the biocatalyst has stabilized and measuring the superficial volume of the biocatalyst ($V_W$), removing the biocatalyst from water and removing excess water from the exterior, but without drying, and immersing the biocatalyst in ethanol at 25° C. for a time sufficient that the volume of the biocatalyst has stabilized and then measuring the superficial volume of the biocatalyst ($V_S$).

The HEV (which is in volume percent) is calculated as the amount of $[V_W/V_S] \times 100\%$.

To assure dehydration with the ethanol, either a large volume ratio of ethanol to biocatalyst is used or successive immersions of the biocatalyst in fresh ethanol are used. The ethanol is initially dehydrated ethanol.

Highly hydrophilic polymers are polymers to which water is attracted, i.e., are hydroscopic. Often the polymers exhibit, when cast as a film, a water contact angle of less than about 60°, and sometimes less than about 45°, and in some instances less than about 10°, as measured by the sessile drop method using a 5 microliter drop of pure distilled water.

Highly hydrated means that the volume of the biocatalyst (excluding the volume of the microorganisms) is at least about 90 percent water.

Industrial wastewater means water that carries waste from industrial or commercial processes, as distinct from domestic wastewater. These wastes may result from any process or activity of industry, manufacture, trade or business, from the development of any natural resource, or from animal operations such as feedlots, poultry houses, or dairies. The term includes contaminated storm water and also leachate from solid waste facilities.

Irreversibly retained and substantially irreversibly retained mean that the microorganisms are adhering to polymeric structures defining open, porous cavities. Irreversibly retained microorganisms do not include microorganisms located on the exterior surface of a biocatalyst. A microorganisms is irreversibly retained even if the biocatalyst has exterior pores of sufficient size to permit egress of the microorganisms.

A matrix is an open, porous, polymeric structure and is an article of manufacture having an interconnected plurality of channels or cavities (herein "major cavities") defined by polymeric structures, said cavities being between about 5 and 100 microns in the smallest dimension (excluding any microorganisms contained therein), wherein fluid can enter and exit the major cavities from and to the exterior of the matrix. The porous matrix may contain larger and smaller channels or cavities than the major cavities, and may contain channels and cavities not open to the exterior of the matrix. The major cavities, that is, open, interconnected regions of between about 5 or 10 to 70 or 100 microns in the smallest dimension (excluding any microorganism contained therein) have nominal major dimensions of less than about 300, preferably less than about 200, microns, and sometimes a smallest dimension of at least about 10 microns. The term open, porous thus refers to the existence of channels or cavities that are interconnected by openings there between.

Municipal wastewater is collected wastewater from two or more sources wherein wastewater is generated by human activity including, but not limited to, human and animal excrement; domestic, commercial, agricultural, mining and industrial wastes and drainage; storm runoff; foodstuffs; and product, intermediate and raw materials disposal. Municipal wastewater typically contains dissolved organics (BOD and COD), solids (Total Suspended Solids, TSS), and various ions including ammonium cation and phosphorus-containing anions.

Permeable means that a component can enter or exit the major cavities from or to the exterior of the biocatalyst.

A phenotypic change or alternation or phenotypic shift is a change in a microorganism's traits or characteristics from environmental factors and is thus different from a change in the genetic make-up of the microorganism.

Population of microorganisms refers to the number of microorganisms in a given volume and include substantially pure cultures and mixed cultures.

Quiescent means that the aqueous medium in a biocatalyst is still; however, flows of nutrients and substrates and bioproducts can occur through the aqueous medium via diffusion and capillary flow.

Retained solids means that solids are retained in the interior of the biocatalyst. The solids may be retained by any suitable mechanism including, but not limited to, restrained by not being able to pass through pores in the skin of a biocatalyst, by being captured in a biofilm or a polysaccharide structure formed by microorganisms, by being retained in the polymeric structure of the biocatalyst, or by being sterically entangled within the structure of the biocatalyst or the microorganisms.

Smallest dimension means the maximum dimension of the shortest of the maximum dimensions defining the length, width and height of a major cavity. Usually a preponderance of the major cavities in a matrix are substantially width and height symmetrical. Hence the smallest dimension can be approximated by the maximum width of a cavity observed in a two dimensional cross section, e.g., by optical or electronic microscopy.

A solubilized precursor for the polymer is a monomer or prepolymer or the polymer itself that is dissolved or dispersed such that solids cannot be seen by the naked eye and is stable. For instance, a solid can be highly hydrated and be suspended in an aqueous medium even though the solid is not dissolved.

A stable population of microorganisms means that the population of microorganisms does not decrease by more than 50 percent nor increase by more than 400 percent.

The wet weight or wet mass of cells is the mass of cells from which free water has been removed, i.e., are at the point of incipient wetness. All references to mass of cells is calculated on the basis of the wet mass of the cells.

References to organic acids herein shall be deemed to include corresponding salts and esters.

References to matrix dimensions and volumes herein are of fully hydrated matrices unless otherwise stated or clear from the context.

Process

The water to be treated (sometimes herein referred to as "raw water stream") may be derived from any suitable source including, but not limited to, surface and groundwater, municipal wastewater and industrial wastewater, including industrial wastewater generated by mining operations including fracturing operations for oil and gas extraction. The substrates present in the raw water can vary depending upon its source. Organocarbon components especially in industrial wastewaters include, but are not limited to, hydrocarbons, such as aliphatic and aromatic hydrocarbons of 1 to 50 or more carbons, including alkanes, alkenes, and alkynes, and aromatics such as benzene, toluene and xylene; ethers, ketones, aldehydes, alcohols, carboxylic acids and esters of 1 to 50 or more carbons; nitrogenous compounds such as amines, amides, peptides, and nitriles; halogenated hydrocarbons such as brominated and chlorinated hydrocarbons including perchloroethylene, dichloroethylene, vinyl chloride, trichloroethane, trichloroethylene, methylene chloride, chloroform, carbon tetrachloride and polychlorinated biphenyls (PCB's), and soluble metal and semi-metal compounds including nitrates, nitrites, sulfates, sulfites, phosphates, phosphites, and other metalates.

Typically municipal wastewater contains organocarbons and ammonium cation. Municipal wastewater typically has a BOD of between about 50 or 100 and 600 or more milligrams of oxygen per liter. The ammonium cation content of municipal wastewater can also vary over a wide range and is often between about 10 and 700, more frequently between about 25 and 200, milligrams per liter. The raw wastewater may contain other components including, but not limited to, sulfur compounds, phosphorus compounds, inorganic salts and solubilized metals. In some instances the processes of this invention may also remove some of the phosphorus and sulfur components from the wastewater.

In addition to catabolic degradation of organocarbon components and oxidation of ammonium cation, in some instances at least a portion of the solids contained in the waste water being processed, e.g., debris from adventitious microorganisms, is hydrolyzed and degraded to further reduce BOD and TSS in the effluent. If desired, the processes of this invention may be operated with the objective of enhancing the hydrolytic degradation of solids, e.g., by increasing hydraulic residence time to allow the microorganisms to produce additional amounts of hydrolytic enzymes and provide additional time to permit the hydrolytic enzymes to reduce solids. Preferably, the wastewater to be treated contains less than about 100 milligrams per liter of solids having a major dimension greater than about 10 microns. If desired, the wastewater can be subjected to one or more unit operations to remove all or a portion of the solids, which may include adventitious microorganisms, prior to being passed to the aerobic bioreactor.

Wastewater is treated in at least one aerobic bioreactor containing ME biocatalyst for the bioconversion of substrate, e.g., the bioconversion of at least one of organocarbon to carbon dioxide and ammonium cation to nitrate and/or nitrite anion. The water in the aerobic bioreactor contains dissolved oxygen. Preferably the dissolved oxygen concentration in the wastewater stream during contact with the ME biocatalyst is at least about 0.5, often at least about 1, say between about 1 and 3, milligrams per liter. Although higher dissolved oxygen concentrations can be used, they generally do not result in any significant increase in bioreactor bioactivity. Conveniently, the oxygen is supplied by air or oxygen-enriched air. The oxygen may be supplied by any convenient means including by bubbling or sparging oxygen containing gas through the water or using eductors such as slot injectors or agitating or otherwise mechanically treating the water such as by spraying to facilitate water-gas contact.

The ME biocatalysts operate well with relatively low oxygen concentrations in the wastewater being treated. Where the oxygen is supplied by an oxygen-containing gas, mass transfer of oxygen to the aqueous phase is enhanced by introducing the oxygen-containing gas as finely divided bubbles. The mass transfer of oxygen into the wastewater can also be increased by increasing the partial pressure of oxygen in the oxygen-containing gas or increasing the contact time between the oxygen-containing gas and wastewater being treated.

The unique performance of the ME biocatalysts typically results in different oxygen requirements than those expected based on mathematical models for conventional activated sludge wastewater treatment processes. Oxygen supply via aeration often represents a significant amount of the total energy use in municipal wastewater treatment facilities. The processes of this invention generally result in a more efficient utilization of the oxygen supplied to the wastewater as compared to conventional activated sludge processes, and may even, in some instances require the same or less oxygen supply than that for conventional activated sludge processes. This low oxygen demand is surprising in that since the processes of this invention do not produce any significant amount of sludge, substantially all carbon in the raw water must eventually be converted to carbon dioxide whereas conventional activated sludge processes assimilate a substantial portion of the carbon in the raw water in the growth of the population of microorganisms. The total rate of oxygen supplied by aeration to achieve a given reduction in carbon and ammonium cation content will be materially influenced by a number of process factors. For instance, the type of process can affect the rate of oxygen mass transfer from the gas phase to the liquid phase. The presence of solids, including sludge and planktonic microorganisms, negatively affect oxygen transfer by increasing the density and viscosity of the wastewater. The processes of this invention do not use activated sludge and achieve inhibition of the growth of the population of adventitious microorganisms that would otherwise increase viscosity. Similarly, the presence of solids such as activated sludge and higher viscosities negatively affect advection in the bioreactor (basin). The higher bioactivity provided by the use of ME biocatalysts in accordance with this invention results in the ability to effect the same degree of bioconversion in a smaller volume, reducing the distance of transport through the liquid phase. Furthermore, conventional activated sludge processes often include flocs or granules or biofilms containing the microorganisms. These structures adversely affect the rate of oxygen transfer to the microorganisms in the structures, and also the structures retain free oxygen which is ultimately lost with removal of sludge. In contrast the ME biocatalysts are highly porous structures with a high HEV that facilitate mass transfer. Since the populations of microorganisms in the ME biocatalysts are substantially stable and the generation of sludge is attenuated, the ratio of (a) oxygen used in the bioconversion of substrate to (b) oxygen used for the maintenance and growth of the adventitious microorganism population is increased, thereby increasing the dissolved oxygen efficiency of the wastewater treatment process. These differences between conventional activates sludge processes and the processes of this invention provide the operator a significant potential to reduce compounded oxygen losses, e.g., through the use of smaller and more efficient aerated basins; minimal loss of oxygen by entrapment in discharged sludge; and limited or no aerobic endogenous metabolism (aerobic digestion of organocarbon compounds comprising the activated sludge, which often includes microbial detritus). Additionally, the ability of the ME biocatalysts to exhibit high bioactivity at relatively low dissolved oxygen concentrations represents an additional savings in aeration costs.

The other aerobic metabolic conditions typically include a temperature in the range of between about 0° C. and 50° C. or more depending upon the temperature tolerance of the microorganism, most frequently, about 5° C. or 10° C. to 40° C. or 45° C.; a pressure in the range from about 70 to 500, say, 90 to 300, kPa absolute although higher and lower pressures can be used; and a pH in the range of between about 3 and 9. For most wastewater facilities, the other conditions of the aerobic treatment are typically those defined by ambient conditions. One of the many advantages of the processes of this invention is that the ME biocatalyst enables desirable bioactivity to be achieved over a broader range of metabolic conditions than those operable for activated sludge processes. Thus, unlike conventional activated sludge processes, sought reductions in organocarbon component and ammonium cation can be achieved using ME biocatalyst containing mesophilic microorganisms even when the ambient temperature of the wastewater is below about 10° C., and even below about 5° C. Moreover, ambient wastewater temperatures that are so high that the bioactivity of activated sludge processes is impaired, e.g., between about 40° C. and 45° C., can be tolerated by ME biocatalyst containing mesophilic microorganisms without undue adverse effect on the population of microorganisms in the ME biocatalyst or on the bioactivity.

The duration of the contact between the wastewater and the biocatalyst during the aerobic treatment in the bioreactor is sufficient to provide the desired reduction of organocarbon component and ammonium cation. The duration will thus depend upon the concentration of the organocarbon component and ammonium cation in the wastewater, the desired reduction, and the density of microorganisms in the bioreactor as well as the conditions employed. Relatively low average hydraulic retention times can be realized. The average hydraulic retention time in some instances for municipal wastewater treatment is less than about 6, and most preferably less than about 4, hours. Thus the bioreactor can be relatively compact, i.e., provide low footprint, yet handle high volumes of wastewater to be treated.

Preferably during the aerobic treatment, the concentration (in mass per liter) of organocarbon components in the treated wastewater is reduced by at least about 70, preferably by at least about 90, percent, and often the treated wastewater has a COD of less than about 30, more preferably less than about 5, milligrams per liter. Where the wastewater being treated contains ammonium cation (which may be in the raw water or result from the degradation of a nitrogenous organocarbon component), the concentration (in mass per liter) of ammonium cation (including the dissolved ammonia) in the treated wastewater is reduced by at least about 70, preferably by at least about 90, percent, and often the treated wastewater has an ammonium anion concentration of less than about 30, most preferably less than about 5, milligrams per liter.

In some instances, denitrification may be conducted in the same bioreactor in which nitrification is occurring where the ME biocatalyst contains microorganisms capable of both ammonia oxidation (deammonification) and denitrification (bioconversion of nitrate anion or nitrite anion to dinitrogen or the bioconversion of ammonia and nitrite anion to dinitrogen and water). Alternatively, ME biocatalyst for oxidation of substrate may be admixed with ME biocatalyst containing denitrification microorganisms in the same bioreactor. Conventional wastewater treatment processes use anaerobic conditions to effect denitrification. It is therefore surprising that denitrification can be conducted under aerobic conditions using ME biocatalyst containing microorganisms that can effect denitrification. The denitrification may alternatively be conducted in a separate unit operation.

ME Biocatalyst

A. ME Biocatalyst Overview

The ME biocatalysts have a polymeric structure (matrix) defining interconnected major cavities, i.e., are open, porous matrices, in which the microorganisms are metabolically retained in the interior of the matrices, that is, the microorganisms promote the adherence rather than being physically restrained by an external structure. In the biocatalysts of this invention, the microorganisms and their communities, inter alia, regulate their population. Also, in conjunction with the sensed nature of the microenvironment in the matrices, it is believed that the microorganisms establish a spatial relationship among the members of the community.

The microorganisms that are retained in the matrices have the ability to form an exo-network. The quiescent nature of the cavities facilitate forming and then maintaining any formed exo-network. A discernable exo-network is not believed essential to achieving phenotypic alterations in the microorganism population such as population modulation and metabolic shift. Where an exo-network develops, often strands of EPS interconnect proximate microorganisms and connect microorganisms to the surface and form the exo-network. In some instances, the microorganisms form thin biofilms and these thin biofilms are encompassed in the exo-network. The biocatalysts have a substantial absence of biofilms in their interiors that are larger than thin biofilms. Hence, any biofilms that may ultimately form in the biocatalysts are relatively thin, e.g., up to about 10, and preferably up to about 2 or 5, microns in thickness, and stable in size. Thus, each thin biofilm is often only a few cells and is connected in an exo-network.

Communication among the microorganisms is believed to occur through emitting chemical agents, including, but not limited to, autoinducers, and communication includes communications for community behavior and for signaling. Often, the preparation of the biocatalysts used in the processes of this invention can result in a population of microorganisms being initially located in the interior of the biocatalyst that is substantially that which would exist at the steady-state level. At these densities of microorganisms in the biocatalysts, community communications are facilitated which are believed to commence during the formation of the biocatalysts, and phenotypic shifts occur to enable the metabolic retention and modulate the population of microorganisms.

Another phenotypic alteration occurring in the biocatalysts, which is believed to be a result of this communication, is a metabolic shift, i.e., the metabolic functions of the community towards reproduction are diminished and the sought bioconversion continues. The population of microorganisms in the biocatalyst may tend to have an old average age due to this shift in the metabolic activity. Older microorganisms also tend to provide a more robust and sustainable performance as compared to younger cells as the older cells have adapted to the operating conditions.

Additional benefits of this communication can be an increase in community-level strength or fitness exhibited by the community in warding off adventitious microorganisms and maintaining strain-type uniformity. In some instances, the microorganisms during use of the biocatalyst may undergo natural selection to cause the strain-type in the community to become heartier or provide another benefit for the survival of the community of microorganisms. In some instances, the communication among the microorganisms may permit the population of microorganisms to exhibit multicellularity or multicellular-like behaviors. Thus the population of microorganisms in a biocatalyst of this invention may have microorganisms adapting to different circumstances but yet working in unison for the benefit of the community.

In some instances the porous matrix may provide modulation of the substrate and nutrients to the microorganisms to effect to optimize metabolic pathways involving substrates that are available, and these pathways may or may not be the primarily used pathways where ample substrate and other nutrients are available. Accordingly, microorganisms in the biocatalysts may exhibit enhanced bioconversion activity for a primarily used pathway or metabolic activity that is normally repressed.

It is also believed that the microenvironments may promote genetic exchange or horizontal gene transfer. Conjugation or bacterial mating may also be facilitated, including the transfer of plasmids and chromosomal elements. Moreover, where microorganisms lyse, strands of DNA and RNA in the microenvironments are more readily accessible to be taken up by microorganisms in these microenvironments. These phenomena can enhance the functional abilities of the microorganisms.

The ME biocatalysts exhibit an increased tolerance to toxins. In some instances, communications among microorganisms and the exo-network may facilitate the population establishing defenses against toxins. The community response to the presence of toxins has been observed in the biocatalysts of this invention. For instance, the biocatalysts survive the addition of toxins such as ethanol and sodium hypochlorite and the original bioconversion activity is quickly recovered thus indicating the survival of essentially the entire community.

In summary, due to the microenvironments in the ME biocatalyst, communication among the microorganisms and the phenotypic alterations undergone by the microorganisms, the biocatalysts provide a number of process-related advantages including, but not limited to,
 no solid debris being generated,
 the potential for high densities of bioactive material in a bioreactor,
 stable population of microorganisms and bioactivity over extended periods of time,
 metabolic shift of microorganisms towards production rather than growth and carbon flow shift,
 ability of microorganisms to undergo essential stasis for extended durations,
 ability to quickly respond to changes in substrate rate of supply and concentration,
 attenuation of diauxic growth,
 enhanced control and modulation of pH and redox balances in the microenvironment of the biocatalyst,
 greater tolerance to substrate, bioproduct and contaminants,
 ability to bioconvert substrate at ultralow concentrations,
 ability to use slower growing and less robust microorganisms and increased resistance to competitiveness,
 enhanced microorganism strain purity capabilities,
 ability to be subjected to in situ antimicrobial treatment,
 ability to quickly start a bioreactor since the density of bioactive material required at full operation is contained in the biocatalyst,
 ability to contact biocatalyst with gas phase substrate, and
 ease of separation of bioproduct from biocatalyst thereby facilitating continuous operations.

If desired, the biocatalysts may be treated to enhance the formation of the exo-network, and if desired, thin biofilms, prior to use in the metabolic process. However, performance of the porous matrices is not generally dependent upon the extent of exo-network formation, and often bioconversion activities remain relatively unchanged between the time before the microorganisms have attached to the polymeric structure and the time when extensive exo-network structures have been generated.

B. Physical Description of the ME Biocatalysts

The ME biocatalysts comprise a matrix having open, porous interior structure with bioactive material irreversibly retained in at least the major cavities of the matrix.

The matrices may be a self-supporting structure or may be placed on or in a preformed structure such as a film, fiber or hollow fiber, or shaped article. The preformed structure may be constructed of any suitable material including, but not limited to, metal, ceramic, polymer, glass, wood, composite material, natural fiber, stone, and carbon. Where self-supporting, the matrices are often in the form of sheets, cylinders, plural lobal structures such as trilobal extrudates, hollow fibers, or beads which may be spherical, oblong, or free-form. The matrices, whether self-supporting or placed on or in a preformed structure, preferably have a thickness or axial dimension of less than about 5, preferably less than about 2, say, between about 0.01 to 1, centimeters.

The porous matrices may have an isotropic or, preferably, an anisotropic structure with the exterior portion of the cross section having the densest structure. The major cavities, even if an anisotropic structure exists, may be relatively uniform in size throughout the interior of the matrix or the size of the major cavities, and their frequency, may vary over the cross-section of the biocatalyst.

The biocatalyst has major cavities, that is, open, interconnected regions of between about 5 or 10 to 70 or 100 microns in the smallest dimension (excluding any microorganisms contained therein). For the purposes of ascertaining dimensions, the dimensions of the microorganisms includes any mass in the exo-network. In many instances, the major cavities have nominal major dimensions of less than about 300, preferably less than about 200, microns, and sometimes a smallest dimension of at least about 10 microns. Often the biocatalyst contains smaller channels and cavities which are in open communication with the major cavities. Frequently the smaller channels have a maximum cross-sectional diameter of between about 0.5 to 20, e.g., 1 to 5 or 10, microns. The cumulative volume of major cavities, excluding the volume occupied by microorganisms and mass associated with the microorganisms, to the volume of the biocatalyst is generally in the range of about 40 or 50 to 70 or 99, volume percent. In many instances, the major cavities constitute less than about 70 percent of the volume of the fully hydrated catalyst with the remainder constituting the smaller channels and pores. The volume fraction of the biocatalyst that constitute the major cavities can be estimated from its cross-section. The cross section may be observed via any suitable microscopic technique, e.g., scanning electron microscopy and high powered optical microscopy. The total pore volume for the matrices can be estimated from the volumetric measurement of the matrices and the amount and density of polymer, and any other solids used to make the matrices.

The ME biocatalyst is characterized by having high internal surface areas, often in excess of at least about 1 and sometimes at least about 10, square meter per gram. In some instances, the volume of water that can be held by a fully hydrated biocatalyst (excluding the volume of the microorganisms) is in the range of 90 to 99 or more, percent. Preferably the biocatalyst exhibits a Hydration Expansion Volume (HEV) of at least about 1000, frequently at least about 5000, preferably at least about 20,000, and sometimes between 50,000 and 200,000, percent.

Usually the type of polymer selected and the void volume percent of the matrices are such that the matrices have adequate strength to enable handling, storage and use in a bioconversion process.

The porous matrices may or may not have an exterior skin. Preferably the matrices have an exterior skin to assist in modulating the influx and efflux of components to and from the interior channels of the porous matrix. Also, since the skin is highly hydrophilic, and additional benefit is obtained as contaminating or adventitious microorganisms have difficulties in establishing a strong biofilm on the exterior of the biocatalyst. These contaminating microorganisms are often subject to removal under even low physical forces such as by the flow of fluid around the biocatalysts. Thus, the fouling of the biocatalyst can be substantially eliminated or mitigated by washing or by fluid flows during use.

Where present, the skin typically has pores of an average diameter of between about 1 and 10, preferably 2 to 7, microns in average diameter. The pores may comprise about 1 to 30, say, 2 to 20, percent of the external surface area. The external skin, in addition to providing a barrier to entry of adventitious microorganisms into the interior of the biocatalyst, is preferably relatively smooth to reduce the adhesion of microorganisms to the external side of the skin through physical forces such as fluid flow and contact with other solid surfaces. Often, the skin is substantially devoid of anomalies, other than pores, greater than about 2 or 3 microns. Where a skin is present, its thickness is usually less than about 50, say, between about 1 and 25, microns. It should be understood that the thickness of the skin can be difficult to discern where the porous matrix has an anisotropic structure with the densest structure being at the exterior of the matrix.

A high density of microorganisms can exist at steady-state operation within the ME biocatalysts. The combination of the flow channels and the high permeability of the polymeric structure defining the channels enable viable microorganism population throughout the matrix, albeit with a plurality of unique microenvironments and nano-environments. In some instances, when the bioactive material comprises microorganisms, the cell density based upon the volume of the matrices is at least about 100 grams per liter, preferably at least about 150 or 200, and often between about 250 and 750, grams per liter.

Solid-Containing ME Biocatalysts

The ME biocatalysts may contain one or more particulate solids which can be used to provide a sought density of the ME biocatalyst. The solid, if desired, may be a solid sorbent. The solid may be the hydrophilic polymer forming the structure or may be a particulate, i.e., a distinct solid structure regardless of shape) contained in the solid structure. Where the solid serves as a sorbent, it may be any suitable solid sorbent for the substrate or nutrients or other chemical influencing the sought metabolic activity such as, but not limited to, co-metabolites, inducers, and promoters or for components that may be adverse to the microorganisms such as, and not in limitation, toxins, phages, bioproducts and by-products. The solid sorbent is typically an adsorbent where the sorption occurs on the surface of the sorbent.

The particulate solids can be used to adjust the density of the ME biocatalyst in the form of discrete particles to facilitate the separation of the biocatalysts from the treated wastewater. Where the ME biocatalysts are sought to be in a bed expanded or fluidized, the density of the ME biocatalysts is typically designed to be in the range of between about 1.05 to 1.2, say, 1.1 to 1.15, grams per cubic centimeter.

The particulate solids are preferably nano materials having a major dimension less than about 5 microns, preferably, between about 5 nanometers to 3 microns. Where the solid is composed of polymer, the solid structure may be essentially entirely composed of the polymer or may be a block copolymer or polymeric mixture constituting between about 5 and 90 mass percent of the solid structure (excluding water). Where the solid is a separate particulate in the biocatalyst, the biocatalyst may comprise between about 5 to 90 mass percent of the mass of the biocatalyst (excluding water and microorganisms but including both the hydrophilic polymer and the particulates). More than one solid may be used in a biocatalyst. Preferably the solid is relatively uniformly dispersed throughout the interior of the biocatalyst although the solid may have a varying distribution within the biocatalyst. Where the distribution varies, the regions with the higher concentration of solid often are found toward the surface of the biocatalyst.

Examples of solids include, without limitation, polymeric materials, especially with polar moieties, carbon (including but not limited to activated carbon), silica (including but not limited to fumed silica), silicates, clays, molecular sieves, and the like. The molecular sieves include, but are not limited to zeolites and synthetic crystalline structures containing oxides and phosphates of one or more of silicon, aluminum, titanium, copper, cobalt, vanadium, titanium, chromium, iron, nickel, and the like. The sorptive properties may comprise one or more of physical or chemical or quasi-chemical sorption on the surface of the solid sorbent. Thus, surface area and structure may influence the sorptive properties of some solid sorbents. Frequently the solid sorbents are porous and thus provide high surface area and physical sorptive capabilities. Often the pores in the solid sorbents are in the range of about 0.3 to 2 nanometers in effective diameter.

The solids may be incorporated into the polymeric structure in any convenient manner, preferably during the preparation of the ME biocatalyst.

Enzyme-Containing ME Biocatalysts

In another aspect, the ME biocatalysts can contain, in addition to the microorganisms, one or more extracellular enzymes in the interior of the biocatalyst to cause a catalytic change to a component which may be substrate or other nutrients, or a bioproduct or by-product or co-product of the microorganisms, or may be a toxin, phage or the like. Typically extracellular enzymes bond or adhere to solid surfaces, such as the hydrophilic polymer, solid additives, cell walls and extracellular polymeric substance. Hence, the enzymes can be substantially irreversibly retained in the interior of the biocatalyst. Due to the structure of the biocatalysts of this invention, the microorganisms and the enzymes can be in close proximity and thus effective, cooperative bioconversions can be obtained. The association of the enzymes with the interior surfaces of the biocatalyst typically increases the resistance of the enzyme or enzymes to denaturation due to changes in temperature, pH, or other factors related to thermal or operational stability of the enzymes. Also, by being retained in the biocatalyst, the use of the enzyme in a bioreactor is facilitated and undesirable post-reactions can be mitigated.

Representative enzymes for carbohydrate conversions to sugars include, without limitation: cellulose, including one or more enzymes in the classes of endo-glucanases, exo-glucanases, and β-glucosidases; endo-1,4-β-D-xylanases; exo-1,4-β-D-xylosidases, endo-1,4-β-D-mannanases; β-mannosidases; acetyl xylan esterases; α-glucuronidases; α-L-arabinofuranosidases; α-galactosidases; laccase; manganese peroxidase; lignin peroxidase; pectin methyl esterase; pectate lyase; polygalacturonase; rhamnoglacturonan lyase; glucuronidase; ferulic acid esterase; α-galactosidase; p-coumaric acid esterase and cellobiohydrolase (e.g., CBHI, CBHII). —The enzymes include those described by Heinzelman et al. (2009) *PNAS* 106:5610-5615, herein incorporated by reference in its entirety.

The enzymes may be bound to the precursor for the hydrophilic polymer of the biocatalyst prior to the formation of the biocatalyst or may be introduced during the preparation of the biocatalyst, e.g., by addition to the liquid medium for forming the biocatalyst. There are many methods that would be known to one of skill in the art for providing enzymes or fragments thereof, or nucleic acids, onto a solid support. Some examples of such methods include, e.g., electrostatic droplet generation, electrochemical means, via adsorption, via covalent binding, via cross-linking, via a chemical reaction or process. Various methods are described in Methods in Enzymology, Immobilized Enzymes and Cells, Part C. 1987. Academic Press. Edited by S. P. Colowick and N. O. Kaplan. Volume 136; Immobilization of Enzymes and Cells. 1997. Humana Press. Edited by G. F. Bickerstaff. Series: Methods in Biotechnology, Edited by J. M. Walker; DiCosimo, R., McAuliffe, J., Poulose, A. J. Bohlmann, G. 2012. Industrial use of immobilized enzymes. Chem. Soc. Rev.; and Immobilized Enzymes: Methods and Applications. Wilhelm Tischer and Frank Wedekind, Topics in Current Chemistry, Vol. 200. Page 95-126.

C. Methods for Making ME Biocatalysts

The components, including bioactive materials, used to make the ME biocatalysts and the process conditions used for the preparation of the biocatalysts are not critical to the broad aspects of this invention and may vary widely as is well understood in the art once understanding the principles described above. In any event, the components and process conditions for making the biocatalysts with the irreversibly, metabolically retained microorganisms should not adversely affect the microorganisms.

The ME biocatalysts may be prepared from a liquid medium containing the bioactive material and solubilized precursor for the hydrophilic polymer which may be one or more of a polymerizable or solidifiable component or a solid that is fusible or bondable to form the matrix. Aqueous media are most often used due to the compatibility of most microorganisms and enzymes with water. However, with bioactive materials that tolerate other liquids, such liquids can be used to make all or a portion of the liquid medium. Examples of such other liquids include, but are not limited to liquid hydrocarbons, peroxygenated liquids, liquid carboxy-containing compounds, and the like. Mixed liquid media can also be used to prepare the biocatalyst. The mixed media may comprise miscible or immiscible liquid phases. For instance, the bioactive material may be suspended in a dispersed, aqueous phase and the polymerizable or solidifiable component may be contained in a continuous solvent phase.

The liquid medium used to prepare the ME biocatalyst may contain more than one type of microorganism, especially where the microorganisms do not significantly compete for the same substrate, and may contain one or more isolated enzymes or functional additives such as polysaccharide, solid sorbent and phosphorescent materials, as described above. Preferably, the biocatalysts contain a single type of microorganism. The concentration of the microorganisms in the liquid medium used to make the biocatalysts should at least be about 60 grams per liter. As discussed above, the concentration of microorganisms should preferably approximate the sought density of microorganisms in the biocatalyst. The relative amounts of microorganism and polymeric material in forming the biocatalyst can vary widely. The growth of the population of microorganisms post formation of the biocatalyst is contemplated as well as the potential for damage to some of the population of microorganisms during the biocatalyst-forming process. Nevertheless, higher microorganism concentrations are generally preferred, e.g., at least about 100 or 150 grams per liter, preferably at least about 200, and often between about 250 and 750, grams per liter of the liquid medium used to make the biocatalysts.

Any suitable process may be used to solidify or polymerize the polymeric material or to adhere or fuse particles to form the open, porous polymeric matrix with microorganism irreversibly retained therein. The conditions of suitable processes should not unduly adversely affect the microorganisms. As microorganisms differ in tolerance to temperatures, pressures and the presence of other chemicals, some matrix-forming processes may be more advantageous for one type of microorganism than for another type of microorganism.

Preferably the polymeric matrix is formed from solidification of a high molecular weight material, by polymerization or by cross-linking of prepolymer in manner that a population of microorganisms is provided in the interior of the biocatalyst as it is being formed. Exemplary of processes include solution polymerization, slurry polymerization (characterized by having two or more initial phases), and solidification by cooling or removal of solvent.

The biocatalysts may be formed in situ in the liquid medium by subjecting the medium to solidification conditions (such as cooling or evaporation) or adding a component to cause a polymerization or cross-linking or agglomeration of solids to occur to form a solid structure such as a catalyst, cross-linking agent or coagulating agent. Alternatively, the liquid medium may be extruded into a solution containing a solidification agent such as a catalyst, cross-linking or coagulating agent or coated onto a substrate and then the composite subjected to conditions to form the solid biocatalyst.

Polymeric materials used to make the biocatalysts may have an organic or inorganic backbone but have sufficient hydrophilic moieties to provide a highly hydrophilic polymer which when incorporated into the matrices exhibits sufficient water sorption properties to provide the sought Hydration Expansion Volume of the biocatalyst. Polymeric materials are also intended to include high molecular weight substances such as waxes (whether or not prepared by a polymerization process), oligomers and the like so long as they form biocatalysts that remain solid under the conditions of the bioconversion process intended for their use and have sufficient hydrophilic properties that the Hydration Expansion Volume can be achieved. As stated above, it is not essential that polymeric materials become cross-linked or further polymerized in forming the polymeric matrix.

Examples of polymeric materials include homopolymers and copolymers which may or may not be cross-linked and include condensation and addition polymers that provide high hydrophilicity and enable the Hydration Expansion Volumes to be obtained. The polymer may be a homopolymer or a copolymer, say, of a hydrophilic moiety and a more hydrophobic moiety. The molecular weight and molecular weight distribution are preferably selected to provide the combination of hydrophilicity and strength as is known in the art. The polymers may be functionalized with hydrophilic moieties to enhance hydrophilicity. Examples of hydrophilic moieties include, but are not limited to hydroxyl, alkoxyl, acyl, carboxyl, amido, and oxyanions of one or more of titanium, molybdenum, phosphorus, sulfur and nitrogen such as phosphates, phosphonates, sulfates, sulfonates, and nitrates, and the hydrophilic moieties may be further substituted with hydrophilic moieties such as hydroxyalkoxides, acetylacetonate, and the like. Typically the polymers contain carbonyl and hydroxyl groups, especially at some adjacent hydrophilic moieties such as glycol moieties. In some instances, the backbone of the polymer contains ether moieties to enhance hydrophilicity. In some instances, the atomic ratio of oxygen to carbon in the polymer is between about 0.3:1 to 5:1.

Polymers which may find use in forming the matrices include functionalized or non-functionalized polyacrylamides, polyvinyl alcohols, polyetherketones, polyurethanes, polycarbonates, polysulfones, polysulfides, polysilicones, olefinic polymers such as polyethylene, polypropylene, polybutadiene, rubbers, and polystyrene, nylons, polythyloxazyoline, polyethylene glycol, polysaccharides such as sodium alginate, carageenan, agar, hyaluronic acid, chondroitin sulfate, dextran, dextran sulfate, heparin, heparin sulfate, heparan sulfate, chitosan, gellan gum, xanthan gum, guar gum, water soluble cellulose derivatives and carrageenan, and proteins such as gelatin, collagen and albumin, which may be polymers, prepolymers or oligomers, and polymers and copolymers from the following monomers, oligomers and prepolymers: monomethacrylates such as polyethylene glycol monomethacrylate, polypropylene glycol monomethacrylate, polypropylene glycol monomethacrylate, methoxydiethylene glycol methacrylate, methoxypolyethylene glycol methacrylate, methacryloyloxyethyl hydrogen phthalate, methacryloyloxyethyl hydrogen succinate, 3-chloro-2-hydroxypropyl methacrylate, stearyl methacrylate, 2-hydroxy methacrylate, and ethyl methacrylate; monoacrylates such as 2-hydroxyethyl acrylate, 2-hydroxypropyl acrylate, isobutyl acrylate, t-butyl acrylate, isooctyl acrylate, lauryl acrylate, stearyl acrylate, isobornyl acrylate, cyclohexyl acrylate, methoxytriethylene glycol acrylate, 2-ethoxyethyl acrylate, tetrahydrofurfuryl acrylate, phenoxyethyl acrylate, nonylphenoxypolyethylene glycol acrylate, nonylphenoxypolypropylene glycol acrylate, silicon-modified acrylate, polypropylene glycol monoacrylate, phenoxyethyl acrylate, phenoxydiethylene glycol acrylate, phenoxypolyethylene glycol acrylate, methoxypolyethylene glycol acrylate, acryloyloxyethyl hydrogen succinate, and lauryl acrylate;

dimethacrylates such as 1,3-butylene glycol dimethacrylate, 1,4-butanediol dimethacrylate, ethylene glycol dimethacrylate, diethylene glycol dimethacrylate, triethylene glycol dimethacrylate, polyethylene glycol dimethacrylate, butylene glycol dimethacrylate, hexanediol dimethacrylate, neopentyl glycol dimethacrylate, polyprene glycol dimethacrylate, 2-hydroxy-1,3-dimethacryloxypropane, 2,2-bis-4-methacryloxyethoxyphenylpropane, 3,2-bis-4-methacryloxydiethoxyphenylpropane, and 2,2-bis-4-methacryloxypolyethoxyphenylpropane;

diacrylates such as ethoxylated neopentyl glycol diacrylate, polyethylene glycol diacrylate, 1,6-hexanediol diacrylate, neopentyl glycol diacrylate, tripropylene glycol diacrylate, polypropylene glycol diacrylate, 2,2-bis-4-acryloxyethoxyphenylpropane, 2-hydroxy-1-acryloxy-3-methacryloxypropane; trimethacrylates such as trimethylolpropane trimethacrylate; triacrylates such as trimethylolpropane triacrylate, pentaerythritol triacrylate, trimethylolpropane EO-added triacrylate, glycerol PO-added triacrylate, and ethoxylated trimethylolpropane triacrylate; tetraacrylates such as pentaerythritol tetraacrylate, ethoxylated pentaerythritol tetraacrylate, propoxylated pentaerythritol tetraacrylate, and ditrimethylolpropane tetraacrylate;

urethane acrylates such as urethane acrylate, urethane dimethyl acrylate, and urethane trimethyl acrylate;

amino-containing moieties such as 2-aminoethyl acrylate, 2-aminoethyl methacrylate, aminoethyl methacrylate, dimethyl aminoethyl methacrylate, monomethyl aminoethyl methacrylate, t-butylaminoethylmethacrylate, p-aminostyrene, o-aminostyrene, 2-amino-4-vinyltoluene, dimethylaminoethyl acrylate, diethylaminoethyl acrylate, piperidinoethyl ethyl acrylate, piperidinoethyl methacrylate, morpholinoethyl acrylate, morpholinoethyl methacrylate, 2-vinyl pyridine, 3-vinyl pyridine, 2-ethyl-5-vinyl pyridine, dimethylaminopropylethyl acrylate, dimethylaminopropylethyl methacrylate, 2-vinyl pyrrolidone, 3-vinyl pyrrolidone, dimethylaminoethyl vinyl ether, dimethylaminoethyl vinyl sulfide, diethylaminoethyl vinyl ether, 2-pyrrolidinoethyl acrylate, 2-pyrrolidinoethyl methacrylate, and other monomers such as acrylamide, acrylic acid, and dimethylacrylamide.

Not all the above listed polymers will be useful by themselves, but may be required to be functionalized or used to form a co-polymer with a highly hydrophilic polymer.

Cross linking agents, accelerators, polymerization catalysts, and other polymerization additives may be employed such as triethanolamine, triethylamine, ethanolamine, N-methyl diethanolamine, N,N-dimethyl benzylamine, dibenzyl amino, N-benzyl ethanolamine, N-isopropyl benzylamine, tetramethyl ethylenediamine, potassium persulfate, tetramethyl ethylenediamine, lysine, ornithine, histidine, arginine, N-vinyl pyrrolidinone, 2-vinyl pyridine, 1-vinyl imidazole, 9-vinyl carbazone, acrylic acid, and 2-allyl-2-methyl-1,3-cyclopentane dione. For polyvinyl alcohol polymers and copolymers, boric acid and phosphoric acid may be used in the preparation of polymeric matrices. As stated above, the amount of cross-linking agent may need to be limited to assure that the matrices retain high hydrophilicity and the ability to have a high Hydration Expansion Volume. The selection of the polymer and cross-linking agents and other additives to make porous matrices having the physical properties set forth above is within the level of the artisan in the art of water soluble and highly hydrophilic polymer synthesis.

The ME biocatalysts may be formed in the presence of other additives which may serve to enhance structural integrity or provide a beneficial activity for the microorganism such as attracting or sequestering components, providing nutrients, and the like. Additives can also be used to provide, for instance, a suitable density to be suspended in the aqueous medium rather than tending to float or sink. Typical additives include, but are not limited to, starch, glycogen, cellulose, lignin, chitin, collagen, keratin, clay, alumina, aluminosilicates, silica, aluminum phosphate, diatomaceous earth, carbon, polymer, polysaccharide and the like. These additives can be in the form of solids when the polymeric matrices are formed, and if so, are often in the range of about 0.01 to 100 microns in major dimension.

If desired, the biocatalyst may be subjected to stress as is known in the art. Stress may be one or more of starvation, chemical or physical conditions. Chemical stresses include toxins, antimicrobial agents, and inhibitory concentrations of compounds. Physical stresses include light intensity, UV light, temperature, mechanical agitation, pressure or compression, and desiccation or osmotic pressure. The stress may produce regulated biological reactions that protect the microorganisms from shock and the stress may allow the hardier microorganisms to survive while the weaker cells die.

Microorganisms

The ME biocatalyst comprises microorganisms, the microorganisms may be unicellular or may be multicellular that behaves as a single cell microorganism such as filamentous growth microorganisms and budding growth microorganisms. Often the cells of multicellular microorganisms have the capability to exist singularly. The microorganisms can be of any type, including, but not limited to, those microorganisms that are aerobes, anaerobes, facultative anaerobes, heterotrophs, autotrophs, photoautotrophs, photoheterotrophs, chemoautotrophs, and/or chemoheterotrophs. The cellular activity, including cell growth can be aerobic, microaerophilic, or anaerobic. The cells can be in any phase of growth, including lag (or conduction), exponential, transition, stationary, death, dormant, vegetative, sporulating, etc. The one or more microorganisms be a psychrophile (optimal growth at −10° C. to 25° C.), a mesophile (optimal growth at 20-50° C.), a thermophile (optimal growth 45° C. to 80° C.), or a hyperthermophile (optimal growth at 80° C. to 100° C.). The one or more microorganisms can be a gram-negative or gram-positive bacterium. A bacterium can be a cocci (spherical), bacilli (rod-like), or spirilla (spiral-shaped; e.g., vibrios or comma bacteria). The microorganisms can be phenotypically and genotypically diverse.

The microorganisms can be a wild-type (naturally occurring) microorganism or a recombinant (including, but not limited to genetically engineered microorganisms) microorganism. A recombinant microorganism can comprise one or more heterologous nucleic acid sequences (e.g., genes). One or more genes can be introduced into a microorganism used in the methods, compositions, or kits described herein, e.g., by homologous recombination. One or more genes can be introduction into a microorganism with, e.g., a vector. The one or more microorganisms can comprise one or more vectors. A vector can be an autonomously replicating vector, i.e., a vector that exists as an extra-chromosomal entity, the replication of which is independent of chromosomal replication, e.g., a linear or closed circular plasmid, an extra-chromosomal element, a mini-chromosome, or an artificial chromosome. The vector can contain a means for self-replication. The vector can, when introduced into a host cell, integrate into the genome of the host cell and replicate together with the one or more chromosomes into which it has been integrated. Such a vector can comprise specific sequences that can allow recombination into a particular, desired site of the host chromosome. A vector system can comprise a single vector or plasmid, two or more vectors or plasmids, which together contain the total DNA to be introduced into the genome of the host cell, or a transposon. The choice of the vector will typically depend on the compatibility of the vector with the host cell into which the vector is to be introduced. The vector can include a reporter gene, such as a green fluorescent protein (GFP), which can be either fused in frame to one or more of the encoded polypeptides, or expressed separately. The vector can also include a selection marker such as an antibiotic resistance gene that can be used for selection of suitable transformants. Means of genetically manipulating organisms are described, e.g., Current Protocols in Molecular Biology, last updated Jul. 25, 2011, Wiley, Print ISSN: 1934-3639. In some embodiments, one or more genes involved in byproduct formation are deleted in a microorganism. In some embodiments, one or more genes involved in byproduct formation are not deleted. Nucleic acid introduced into a microorganism can be codon-optimized for the microorganism. A gene can be modified (e.g., mutated) to increase the activity of the resulting gene product (e.g., enzyme). Sought properties in wild-type or genetically modified microorganisms can often be enhanced through a natural modification process, or self-engineering process, involving multigenerational selective harvesting to obtain strain improvements such as microorganisms that exhibit enhanced properties such as robustness in an environment or bioactivity. See, for instance, Ben-Jacob, et al., Self-engineering capabilities of bacteria, J. R. Soc. Interface 2006, 3, doi: 10.1098/rsif.2005.0089, 22 Feb. 2006.

The selected microorganism to be used in a biocatalyst can be targeted to the sought activity. The biocatalysts thus often contain substantially pure strain types of microorganisms and, because of the targeting, enable high bioactivity to be achieved and provide a stable population of the microorganism in the biocatalyst.

The microorganisms used can in many instances of treating wastewater be naturally occurring microorganisms conventionally used for the treatment of such wastewater streams including but not limited to activated sludge. The ME biocatalysts can also be prepared using targeted microorganisms for particular bioactivity in catabolizing organocarbon components especially where industrial wastewaters are being treated.

Examples of microorganisms capable of converting organocarbon to carbon dioxide include, but are not limited to, *Acinetobacter Johnsonii, Alcanivorax dieselolie, Azoarcus* sp, *Bacillus globiformis, Bacillus mojavensis, Bacillus subtilis, Escherichia coli, Eubacterium biforme, Lactosphaera pasteurii. Microthirx parvicella, Moraxella cuniculi, Nocardia asteroids, Pseudomonas pseudoalcaligenes, Rhodococcus rhodnii, Rhodococcus coprophilus, Rhodoferax fermentans, Rhodococcus jostii, Saccharophagus degradans, Skermania piniformis, Sphingomonas capsulate, Variovorax paradoxus,* and *Zoogloea* sp. Typical nitrifying microorganisms include those from *Nitrosomonas, Nitrosococcus, Nitrobacter,* and *Nitrococcus* families. Typical denitrifying microorganisms include species of *Pseudomonas, Achromobacter, Bacillus* and *Micrococcus* such as *Paracoccus denitrificans, Thiobacillus denitrificans,* and *Micrococcus denitrificans.* Denitrifying microorganisms include those that bioconvert nitrite and ammonium to free nitrogen including, but not limited to, anammox bacteria such as *Planctomycetes,* e.g., *Candidatus brocadia anammoxidans,*

*Candidatus brocadia fulgida, Candidatus anammoxoglobus, Cadidatus kuenenia, Candidatus jettenia* and *Candidatus scalindua.*

Bioreactor and Operations

The bioreactor may be of any suitable type. Bioreactors include up-flow and down-flow packed bioreactors, trickle bed bioreactors, ponds, bubble column bioreactors (using generated carbon dioxide for the gas phase), stirred bioreactors, fluidized bed bioreactors, plug flow (tubular) bioreactors, rotating disc bioreactors and membrane bioreactors. The ME biocatalyst can be freely mobile in the wastewater being treated or fixed, e.g., to a structure in the reactor vessel, or can itself provide a fixed structure. More than one reactor vessel or stage can be used in a bioreactor. For instance, reactor vessels may be in parallel or in sequential flow series.

In some instances, a bioreactor containing a plurality of vessels or stages with fluid intermixing there between are desired. In such instances, at least 2, and sometimes between about 3 and 20, stages are used. Where the bioreactor comprises a fluidized bed bioreactor, the density of the ME biocatalyst in each stage may be selected to efficiently circulate therein. The co-produced carbon dioxide may be discharged from each stage or all, or a portion of the carbon dioxide may be passed to a subsequent stage to promote mixing.

Where more than one stage is used in a bioreactor, the metabolic conditions in each stage may be the same or different. For instance, at least one initial stage may be operated on an oxygen-limited basis (low dissolved oxygen, e.g., below about 1 or 1.5 milligrams per liter) with at least one subsequent stage being operated with a higher dissolve oxygen concentration. In this manner, a reduction in the overall supply of air to the bioreactor may be achieved. At least one subsequent stage can be operated under very low or anoxic conditions the promote denitrification. Where the ME biocatalyst is mobile, screens or other separation units such as gravity separators, can be used to prevent flow of ME biocatalyst from one stage to another. In some instances, ME biocatalyst may be permitted to pass from one stage to a subsequent stage, then separated from the treated wastewater and recycled to the prior stage, e.g., using separation unit operations as described above.

In some instances the flow of wastewater to the bioreactor is variable. For instance, municipal wastewater facilities experience a diurnal flow range of up to four fold. Moreover, rain, snow melt, and the like can further increase the flow. In one use of the processes of this invention, the bioreactor supplements the wastewater plant during periods of high volume feed. The ME biocatalyst enhances the robustness of the microorganisms irreversibly retained therein such that bioactivity can be quickly reestablished when needed. In some instances, a low rate of wastewater feed can be beneficial to maintain the microorganisms in an acclimated state. In such situation, a portion of the wastewater may be directed to the subsequent stage. It should be noted that the net production of sludge is not materially affected by variations in flow of wastewater to the bioreactor as the high bioactivity provided by the ME biocatalysts consumes carbon source which is required for the adventitious microorganisms to grow their population.

In preferred embodiments using tank-type bioreactors, the bioreactor is adapted to provide agitation by one or more of mechanical means or flow of the wastewater or by the passage of air or other oxygen-containing gas through the wastewater in the bioreactor. The agitation enhances mixing of the wastewater and, in the event that the ME biocatalyst is particulate, mitigates against compaction of the particles. The processes of this invention are useful in deeper bioreactors. The deeper the bioreactor, the more mass that is required to be suspended. In typical free cell systems, agglomerations of solids are generated which must be suspended. This results in a balance between the depth of the bioreactor and the cost of air supply, and hence, typical free cell suspension aerobic bioreactors do not have depths greater than about 10 meters. Increased depth is advantageous both in terms of capital costs and footprint and in terms of additional contact time with air for mass transfer of oxygen.

EXAMPLES

The following examples are provided in illustration of the ME biocatalysts and processes for making the biocatalysts and are not in limitation. All parts and percentages of solids are by mass and of liquids and gases are by volume unless otherwise stated or is clear from the context.

In these examples, the following general procedure is used. The microorganisms for the biocatalyst are grown under suitable planktonic conditions in an aqueous medium for the microorganisms including the presence of nutrients and micronutrients. This medium is referred to herein as the "Culture Medium". The microorganisms used are as available and thus may be either substantially pure strains or mixed cultures. The cell density in the Culture Medium is determined by optical density. If the cell density of the Culture Medium is below that sought to make the biocatalyst, the Culture Medium is centrifuged or filtered to provide a denser, cell-containing fraction. A separately prepared aqueous solution of solubilized precursor is made (referred to herein as the "Polymer Solution"). Any solid additive for the biocatalysts is added to the Polymer Solution in amounts that will provide the sought amount in the biocatalyst. The Polymer Solution is mixed with a mechanical stirrer to assure uniform dispersion of the components in the aqueous medium. Where necessary to solubilize the precursor, the Polymer Solution can be heated as appropriate. In some instances, a micronutrient solution is also added to the Polymer Solution.

Aliquots of each of the Culture Medium (or dense phase from centrifugation) and Polymer Solution are admixed under mechanical stirring at about 30° C. to for a Precursor Solution. Where the microorganism is anaerobic, the Culture Medium and the mixing of the Culture Medium and Polymer Solution and all subsequent steps are maintained under anaerobic conditions by purging with nitrogen.

The Precursor Solution is then extruded through a perforated plate having orifices of about 0.75 millimeter in diameter to form droplets of about 3 millimeters in diameter. The droplets fall into a gently stirred coagulating bath of an aqueous boric acid solution having a pH of about 5. The biocatalyst is recovered from the coagulating bath and washed with distilled water. The biocatalyst, after washing, is placed in a liquid medium containing micronutrients and the substrate under suitable metabolic conditions for the microorganisms.

Table I summarizes the examples. Table II sets forth the microorganisms used in the examples. Table III sets forth the hydrophilic polymer(s) that is used in the examples. Table IV sets forth the solid additive packages used in the examples.

TABLE I

| Example | Polymer Solution | Volume parts Polymer Solution per 100 parts of Precursor Solution | Microorganism | Microorganism culture density wet weight g/L | Volume parts Microorganism culture per 100 parts of Precursor Solution | Solid Additive Package | Mass parts of Solid Additive package per liter of Precursor Solution |
|---|---|---|---|---|---|---|---|
| 1 | Y | 72 | M-13 | 375 | 28 | N/A | N/A |
| 2 | OOO | 90 | M-21 | 700 | 10 | S-23 | 5.5 |
| 3 | KKK | 50 | M-36 | 95 | 50 | S-27 | 0.1 |
| 4 | Z | 60 | M-40 | 250 | 40 | S-6 | 1.2 |
| 5 | QQ | 40 | M-41 | 65 | 60 | S-13 | 0.7 |
| 6 | C | 76 | M-36 | 540 | 24 | N/A | N/A |
| 7 | TT | 84 | M-37 | 610 | 16 | S-13 | 10.0 |
| 8 | JJ | 75 | M-41 | 520 | 25 | S-26 | 0.5 |
| 9 | MMM | 85 | M-25 | 730 | 15 | N/A | N/A |
| 10 | A | 81 | M-55 | 600 | 19 | S-24 | 0.17 |
| 11 | ZZ | 77 | M-12 | 530 | 23 | S-6 | 1.6 |
| 12 | Q | 77 | M-12 | 650 | 23 | N/A | N/A |
| 13 | Y | 73 | M-12 | 480 | 27 | S-13 | 5.0 |
| 14 | MMM | 75 | M-12 | 460 | 25 | N/A | N/A |
| 15 | J | 78 | M-13 | 665 | 22 | S-23 | 1.2 |
| 16 | G | 62 | M-55 | 495 | 38 | S-7 | 0.5 |
| 17 | GG | 57 | M-55 | 190 | 43 | S-13 | 0.9 |
| 18 | F | 76 | M-40 | 580 | 24 | N/A | N/A |
| 19 | GGG | 62 | M-41 | 330 | 38 | S-14 | 7.5 |
| 20 | CC | 75 | M-41 | 555 | 25 | S-2 | 0.74 |
| 21 | BBB | 73 | M-14 | 435 | 27 | N/A | N/A |
| 22 | BBB | 74 | M-55 | 550 | 26 | S-12 | 0.58 |
| 23 | VVV | 64 | M-12 | 425 | 36 | S-19 | 1.0 |
| 24 | SS | 84 | M-13 | 735 | 16 | S-2 | 0.1 |
| 25 | MMM | 71 | M-12 | 500 | 29 | N/A | N/A |

TABLE II

| Microorganism Identifier | Microorganism |
|---|---|
| M-12 | *Nitrobacter winogradskyi* ATCC ® 25391 ™ |
| M-13 | *Nitrosomonas europaea* ATCC ® 19718 ™ |
| M-14 | *Nitrosomonas oceani* ATCC ® 19707 ™ |
| M-21 | *Rhodobacter sphaeroides* ATCC ® 17029 ™ |
| M-25 | *Actinobacillus succinogenes* ATCC ® 55618 ™ |
| M-26 | *Corynebacterium glutamicum* ATCC ® 13032 ™ |
| M-36 | *Achromobacter denitrificans* ATCC ® 15173 ™ |
| M-37 | *Paracoccus denitrificans* ATCC ® 17741 ™ |
| M-40 | *Rhodococcus* sp. ATCC ® 55309 ™ |
| M-41 | *Rhodococcus* sp. ATCC ® 21504 ™ |
| M-55 | *Paracoccus denitrificans* ATCC ® 19367 ™ |

TABLE III

| Polymer Solution Identifier | Composition |
|---|---|
| A | 8.0 wt. percent of polyvinyl alcohol available as Elvanol ® 70-04 from Dupont, Inc. having a degree of hydrolysis of 98.0-98.8 mol percent; 2.0 wt. percent of sodium alginate available as Nalgin ™ MV-120 from Ingredient Solutions, Inc.; 0.5 wt. percent of medium molecular weight Poly(D-glucosamine) available as Sigma-Aldrich ® 448877 |
| C | 14 wt. percent of poly(vinyl alcohol-co-ethylene) available as Sigma-Aldrich ® 414093 having an ethylene composition of 32 mol percent; 2.0 wt. percent of polyethylene glycol with an average molecular weight of 200 available as Sigma-Aldrich ® P3015 |
| F | 23.0 wt. percent of polyvinyl alcohol available as Elvanol ® 70-03 from Dupont ™ having a degree of hydrolysis of 98-98.8 mol percent; 1.0% wt. percent of anhydrous calcium chloride available as Sigma-Aldrich ® C1016; 0.9 wt. percent of sodium alginate available as Nalgin ™ MV-120 from Ingredient Solutions, Inc. |
| G | 22.5 wt. percent of polyvinyl alcohol available as Elvanol ® 70-20 from Dupont ™ having a degree of hydrolysis of 98.5-99.2 mol percent; 2.0 wt. percent of xantham gum from *Xanthamonas campestris* available as Sigma-Aldrich ® G1253 |
| J | 12.0 wt. percent of Poly(acrylamide-co-acrylic acid) potassium salt-cross-linked available as Sigma-Aldrich ® 432776; 2.0 wt. percent of sodium alginate available as Nalgin ™ MV-120 from Ingredient Solutions, Inc. |
| Q | 13.0 wt. percent of polyethylene oxide available as POLYOX ™ WSR N-80 from Dow, Inc. having an approximate molecular weight of 200,000; 2.1 wt. percent polyaniline available as Sigma-Aldrich ® 577073 |
| Y | 12.5 wt. percent of polyvinyl alcohol available as Elvanol ® 50-04 from Dupont ™ Inc. having a degree of hydrolysis of 87.0-89.0 mol percent; 3.0 wt. percent of ethylene glycol dimethacrylate available as Sigma-Aldrich ® 335681; 1.0 wt. percent κ-Carrageenan available as Sigma-Aldrich ® 22048 |
| Z | 20.0 wt. percent of Elvanol ® 70-04 polyvinyl alcohol from Dupont, Inc. having a degree of hydrolysis of 98.0-98.8 mol percent; 1.90 wt. percent of sodium alginate available as Nalgin ™ MV-120 from Ingredient Solutions, Inc.; 1.0 wt. percent κ-Carrageenan available as Sigma-Aldrich ® 22048 |

TABLE III-continued

| Polymer Solution Identifier | Composition |
|---|---|
| CC | 25.0 wt. percent of polyethylene-alt-maleic anhydride available as Sigma-Aldrich® 188050 having an average molecular weight 100,000-500,000; 2.2 wt. percent of polyethylene glycol with an average molecular weight of 200 available as Sigma-Aldrich® P3015 |
| GG | 14.4 wt. percent of polyvinyl alcohol available as Elvanol® 70-14 from Dupont™ Inc. having a degree of hydrolysis of 95.0-97.0 mol percent; 14.0 wt. percent of polyacrylic acid with an average molecular weight of 1800 available as Sigma-Aldrich® 323667 |
| JJ | 7.7 wt. percent of polyvinyl alcohol available as Poval® PVA-202E from Kuraray Co., Ltd.™ having a degree of hydrolysis of 87-89 mol percent; 3.4 wt. percent of medium molecular weight Poly(D-glucosamine) available as Sigma-Aldrich® 448877 |
| QQ | 40.0 wt. percent of polyvinyl alcohol available as Poval® PVA-224E from Kuraray Co., Ltd.™ having a degree of hydrolysis of 80-83 mol percent; 0.7 wt. percent of medium molecular weight Poly(D-glucosamine) available as Sigma-Aldrich® 448877 |
| SS | 5.6 wt. percent of ethylene vinyl alcohol copolymer available as Exceval™ HR-3010 from Kuraray Co., Ltd.™ having a degree of hydrolysis of 99-99.4 mol percent; 0.1 wt. percent of sodium carboxymethyl cellulose with an average molecular weight of 250,000 available as Sigma-Aldrich® 419311 |
| TT | 6.9 wt. percent of polyethylene oxide available as POLYOX™ WSR N-80 from Dow, Inc. having an approximate molecular weight of 200,000; 6.0 wt. percent of Poly(2-hydroxyethyl methacrylate) available as Sigma-Aldrich® P3932 |
| ZZ | 9.0 wt. percent of polyvinyl alcohol available as Mowial® 10-98 from Kuraray Co., Ltd.™ having a degree of hydrolysis of 98.0-98.8 mol percent and a molecular weight of 61,000; 0.3 wt. percent of Poly(2-hydroxyethyl methacrylate) available as Sigma-Aldrich® P3932 |
| BBB | 15.5 wt. percent of polyvinyl alcohol available as Mowial® 28-99 from Kuraray Co., Ltd.™ having a degree of hydrolysis of 99.0-99.8 mol percent and a molecular weight of 145,000; 1.5 wt. percent polyethylene glycol with an average molecular weight of 1450 available as Sigma-Aldrich® P5402 |
| GGG | 25.9 wt. percent of polyvinyl alcohol available as Sigma-Aldrich® 363065 having a degree of hydrolysis of 99+ mol percent and a molecular weight of 146,000-186,000; 2.9 wt. percent of sodium alginate available as Nalgin™ MV-120 from Ingredient Solutions, Inc.; 2.7 wt. percent of polyacrylic acid with an average molecular weight of 1800 available as Sigma-Aldrich® 323667 |
| KKK | 20.0 wt. percent of poly(acrylic acid) available as Sigma-Aldrich® 192023 having an average molecular weight of 2000; 8.0 wt. percent of Poly(2-hydroxyethyl methacrylate) available as Sigma-Aldrich® P3932; 2.0 wt. percent of ethylene glycol dimethacrylate available as Sigma-Aldrich® 335681 |
| MMM | 9.0 wt. percent of poly(N-isopropylacrylamide) available as Sigma-Aldrich® 535311 having a molecular weight of 19,000-30,000; 2.0 wt. percent of sodium alginate available as Nalgin™ MV-120 from Ingredient Solutions, Inc. |
| OOO | 2.1 wt. percent of poly(vinyl alcohol-co-ethylene) available as Sigma-Aldrich® 414093 having an ethylene composition of 32 mol percent; 0.1 wt. percent of medium molecular weight Poly(D-glucosamine) available as Sigma-Aldrich® 448877 |
| VVV | 10.5 wt. percent of ethylene vinyl alcohol copolymer available as Exceval™ RS-1717 from Kuraray Co., Ltd.™ having a degree of hydrolysis of 92-94 mol percent; 2.2 wt. percent of Poly(2-hydroxyethyl methacrylate) available as Sigma-Aldrich® P3932 |

TABLE IV

| Solid Additive Package Identifier | Composition |
|---|---|
| S-2 | Clay available as Nanomer® PGV hydrophilic bentonite from Sigma-Aldrich® 682659 |
| S-6 | Natural bentonite clay as Cloisite® 116 from Southern Clay Products/Rockwood Additives |
| S-7 | Granular activated carbon having an effective size 0.7-0.9 mm available as HYDRODARCO® 3000 from Norit Americas |
| S-12 | Sodium hydroxide coated silica available as Ascarite® II from Sigma-Aldrich 223913 |
| S-13 | Starch as available from Sigma-Aldrich® S4251 |
| S-14 | Starch as available from Spectrum® M1372 |
| S-19 | Sphagnum Peat Moss Absorbent available as CEP-PEAT2-P from Complete Environmental Products, Inc. |
| S-23 | Chitin as available as Sigma-Aldrich® C7170 |
| S-24 | Iron oxide as available as Sigma-Aldrich® 310069 |
| S-26 | Polyethylene powder as MIPELON™ from Mitsui Chemicals America, Inc. |
| S-27 | Untreated wheat germ as available as Sigma-Aldrich® W0125 |

Each of the above biocatalysts exhibit phenotypic alterations and the biocatalysts have a stable population of microorganisms and do not generate any appreciable debris from metabolic activity. The ME biocatalyst of Example 25 is able to denitrify in an aerobic environment, especially with a dissolved oxygen concentration of less than about 3 milligrams per liter of wastewater.

It is claimed:

1. A process for treating wastewater comprising (i) a substrate comprising at least one organocarbon component and, optionally, ammonium cation and (ii) at least one population of adventitious microorganisms capable of bioconverting said substrate and generating sludge, said processes comprising contacting said wastewater in a bioreactor under aerobic metabolic conditions with biocatalyst for a time sufficient to oxidize at least a portion of the substrate and provide a treated wastewater, and selectively removing the treated wastewater from the biocatalyst, wherein:

a. the biocatalyst comprises:
      i. a solid structure of hydrated hydrophilic polymer defining an interior structure having a plurality of interconnected major cavities having a smallest dimension of between about 5 and 100 microns and a Hydration Expansion Volume (HEV), which is calculated in volume percent, of at least about 1000 and
      ii. a population of microorganisms capable of oxidizing said substrate, said population of microorganisms being substantially irreversibly retained in the interior of the solid structure, said population of microorganisms being in a concentration of at least about 60 grams per liter based upon the volume defined by the exterior of the solid structure when fully hydrated, wherein the microorganisms maintain their population substantially stable; and b. the biocatalyst is present in the bioreactor in an amount sufficient to bioconvert substrate and inhibit the population growth of said adventitious microorganisms, said amount of biocatalyst being sufficient to provide in the wastewater in the bioreactor a concentration of the microorganisms irreversibly retained in the interior of the biocatalyst of at least about 8000 milligrams per liter.

2. The process of claim 1 wherein the wastewater comprises municipal wastewater and the substrate contains at least one organocarbon component and ammonium cation.

3. The process of claim 1 wherein the wastewater comprises industrial wastewater.

4. The process of claim 1 wherein the bioreactor has a single stage.

5. The process of claim 1 wherein the bioreactor has at least two stages.

6. The process of claim 5 wherein the stages are sequential.

7. The process of claim 6 wherein at least one stage is maintained under different metabolic conditions than at least one other stage.

8. The process of claim 7 wherein the biocatalyst in at least a terminal stage is capable of denitrification and the terminal stage has a lower dissolved oxygen concentration than at least one prior stage.

9. The process of claim 8 wherein a portion of the wastewater is introduced into the terminal stage to provide carbon source.

10. The process of claim 7 wherein at least one subsequent stage contains biocatalyst capable of nitrification of ammonium cation.

11. The process of claim 7 wherein a portion of the wastewater is added to a subsequent stage.

12. The process of claim 1 wherein the biocatalyst is particulate and at least a portion is retained in the treated wastewater, and the retained biocatalyst is separated and recycled to the bioreactor.

13. The process of claim 12 wherein the biocatalyst has a density of between about 1.05 and 1.15 grams per cubic centimeter.

14. The process of claim 1 wherein the biocatalyst is particulate and is retained in the bioreactor.

15. The process of claim 14 wherein at least two different biocatalysts are contained in the bioreactor.

16. The process of claim 1 wherein the microorganisms irreversibly retained in the interior of the biocatalyst produce hydrolytic enzymes and the contact between the wastewater and biocatalyst is sufficient to hydrolyze at least a portion of the solids in the wastewater.

17. The process of claim 1 wherein the dissolved oxygen concentration in the wastewater is between about 1 and 3 milligrams per liter.

18. A process for treating wastewater containing at least one substrate comprising (i) a substrate comprising at least one organocarbon component and ammonium cation and (ii) at least one population of adventitious microorganisms capable of bioconverting said substrate and generating sludge, said processes comprising contacting said wastewater in a bioreactor under aerobic metabolic conditions with biocatalyst for a time sufficient to oxidize at least a portion of the substrate and provide a treated wastewater, and selectively removing the treated wastewater from the biocatalyst, wherein:

a. the biocatalyst comprises:

i. a solid structure of hydrated hydrophilic polymer defining an interior structure having a plurality of interconnected major cavities having a smallest dimension of between about 5 and 100 microns and a Hydration Expansion Volume (HEV), which is calculated in volume percent, of at least about 1000 and ii. a population of microorganisms capable of oxidizing said substrate, said population of microorganisms being substantially irreversibly retained in the interior of the solid structure, said population of microorganisms being in a concentration of at least about 60 grams per liter based upon the volume defined by the exterior of the solid structure when fully hydrated, wherein the microorganisms maintain their population substantially stable;

b. the biocatalyst is present in the bioreactor in an amount sufficient to provide an irreversibly-retained microorganism population in excess of about 8000 milligrams per liter of wastewater in the bioreactor; and c. the wastewater in the bioreactor has a dissolved oxygen concentration of less than about 3 milligrams per liter.

19. A process for treating wastewater comprising (i) a substrate comprising at least one organocarbon component and, optionally, ammonium cation and (ii) at least one population of adventitious microorganisms capable of bioconverting said substrate and generating sludge, said processes comprising contacting said wastewater in a bioreactor under aerobic metabolic conditions with biocatalyst for a time sufficient to oxidize at least a portion of the substrate and provide a treated wastewater, and selectively removing the treated wastewater from the biocatalyst, wherein:

a. the biocatalyst comprises:

i. a solid structure of hydrated hydrophilic polymer defining an interior structure having a plurality of interconnected major cavities having a smallest dimension of between about 5 and 100 microns and a Hydration Expansion Volume (HEV), which is calculated in volume percent, of at least about 1000 and ii. a population of microorganisms capable of oxidizing said substrate, said population of microorganisms being substantially irreversibly retained in the interior of the solid structure, said population of microorganisms being in a concentration of at least about 60 grams per liter based uponthe volume defined by the exterior of the solid structure when fully hydrated, wherein the microorganisms maintain their population substantially stable; and b. the biocatalyst is present in the bioreactor in an amount sufficient to bioconvert substrate and inhibit the population growth of said adventitious microorganisms, said amount of biocatalyst being sufficient to provide in the wastewater in the bioreactor a concentration of the microorganisms irreversibly retained in the interior of the biocatalyst of at least about 12,000 milligrams per liter.

20. The process of claim 18 wherein the bioreactor contains biocatalyst containing microorganisms for denitrification, and said denitrification is effected under aerobic conditions.

\* \* \* \* \*